June 26, 1934.    R. R. ROOT    1,964,176
DUSTING MACHINE
Filed June 25, 1929    2 Sheets-Sheet 1
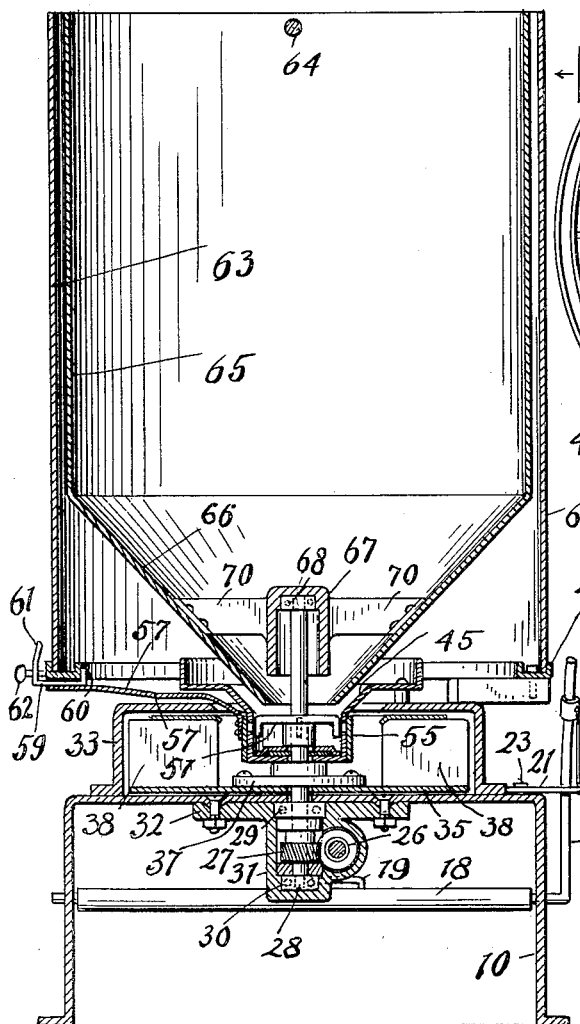
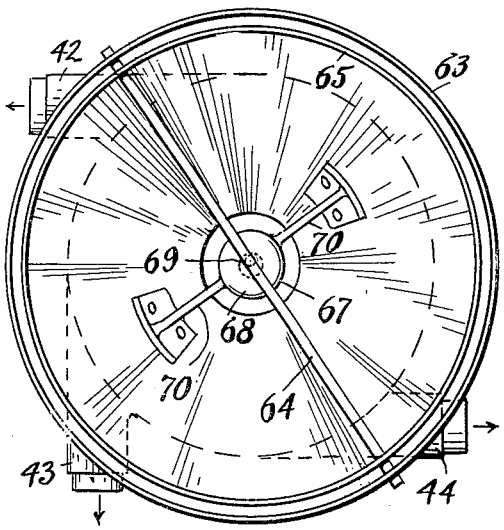
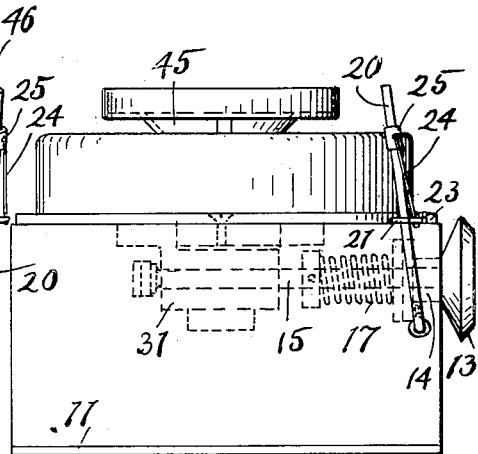
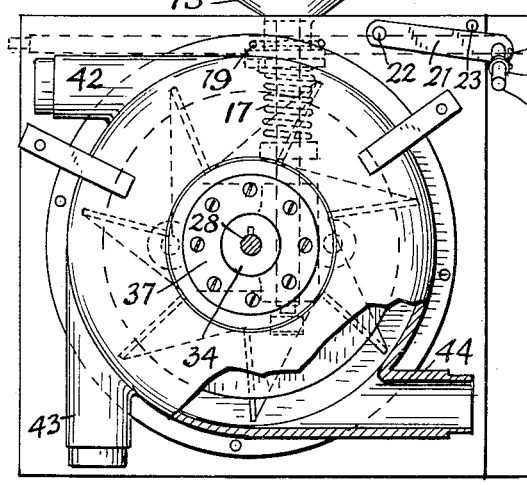
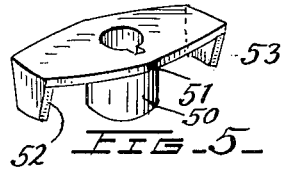
Inventor
Ralph R. Root
Kwis Hudson & Kent
attys.

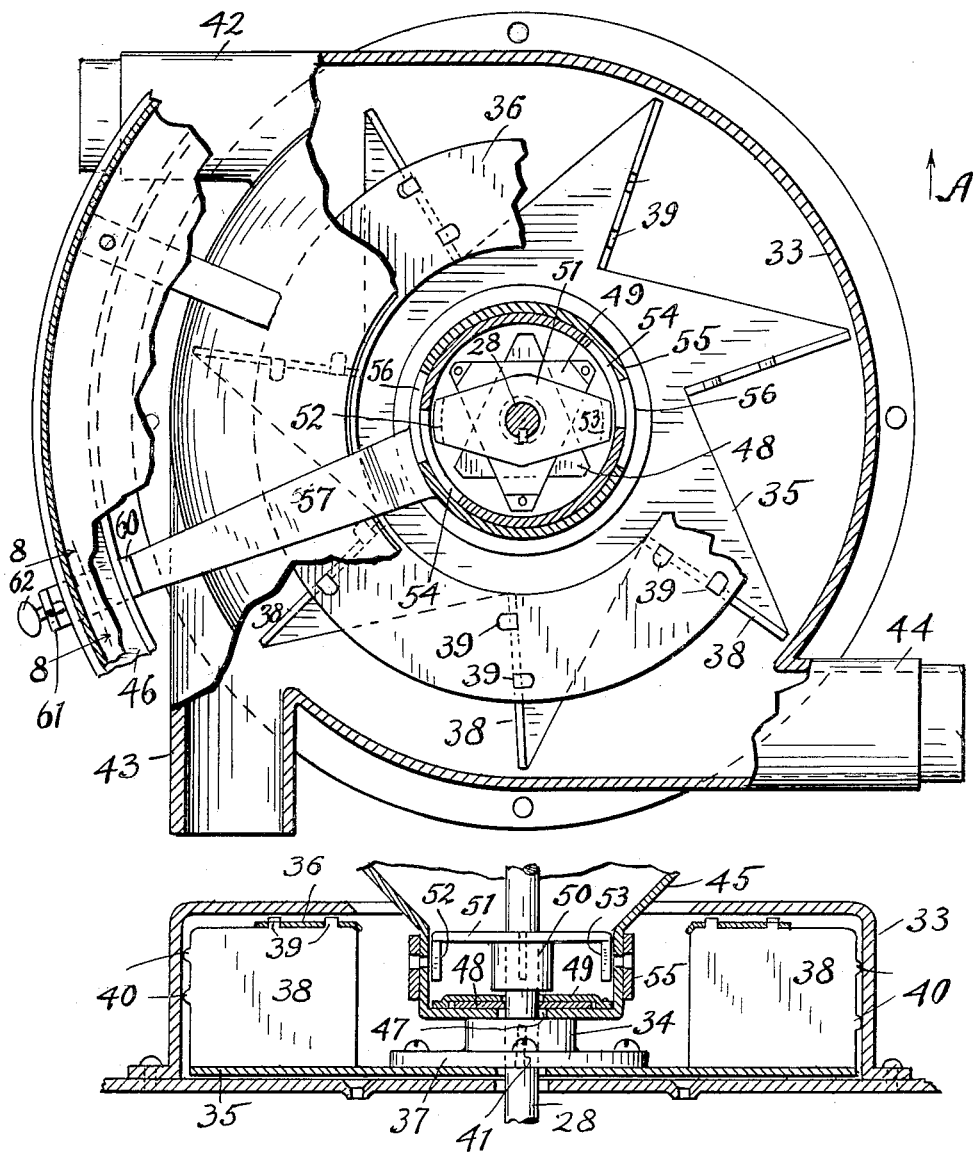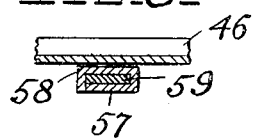

Patented June 26, 1934

1,964,176

UNITED STATES PATENT OFFICE 1,964,176

DUSTING MACHINE

Ralph R. Root, Lakewood, Ohio, assignor to The Root Manufacturing Company, Cleveland, Ohio, a corporation of Ohio Application June 25, 1929, Serial No. 373,507

12 Claims. (Cl. 221—118)

This invention relates to improvements in dusting machines, that is machines employed for dispensing powdered material such, for instance, as insecticides. The machine is intended for power operation, as by means of a small internal combustion engine, the complete unit being mounted upon a suitable vehicle in order that it may be drawn over the ground during the dusting operation.

One of the objects of the invention is the provision of a machine of this character, of simple construction, employing relatively few parts, capable of delivering a large quantity of powder with a small power consumption.

Another object is the provision of novel means for storing the powder and insuring a constant supply in the feeder regardless of the quantity in the storage hopper.

Another object is the provision of a hopper shaking means, whereby the use of powder stirring mechanism is avoided.

Another object of the invention is the provision of a centrifugal fan housing with a plurality of exit connections whereby the quantity of powder delivered for a given fan size and power consumption is greatly increased over the amount delivered from a single exit connection.

Another object is the provision of a plurality of outlets from the feeder bowl in combination with a fan housing having a plurality of exit connections, whereby the dust content of the various streams of air leaving the housing is substantially the same.

Another object of the invention is the provision of a novel whipper in the feeder bowl for maintaining an even flow of dust into the fan casing, and particularly a whipper so constructed as to free itself from any lint which may be contained in the powder.

Another object is the provision of a special holder for the bearing of the eccentric at the upper end of the hopper shaking shaft, whereby the bearing is protected from dust by an air pocket.

Another object is the provision of a special washer construction for sealing the bottom of the feeder bowl, while at the same time permitting a certain amount of vibration of the whipper shaft without undue friction.

Another object is the provision of means for regulating, simultaneously, the size of the various outlets from the feeder bowl.

Still another object is the provision of a fan of simple sheet metal construction nicely balanced and supplied with means for maintaining its path of movement free from an accumulation of dust on the walls of the casing.

Other objects and features of novelty will appear as I proceed with the description of that embodiment of the invention which, for purposes of the present application, I have illustrated in the accompany drawings in which Fig. 1 is an elevational view principally in section through the vertical axis of the machine showing a preferred embodiment of the invention.

Fig. 2 is a plan view of the same with the hopper removed, certain parts being shown in section, and others broken away in order to more fully illustrate the invention.

Fig. 3 is a top plan view with the hopper in place.

Fig. 4 is a side elevation with the hopper removed, this view being taken at right angles to that of Fig. 1.

Fig. 5 is a perspective view of the whipper.

Fig. 6 is a plan view on a larger scale illustrating, partially in section, the fan and fan housing and the feeder bowl and whipper.

Fig. 7 is a vertical sectional view of the same.

Fig. 8 is a detail sectional view taken substantially on line 8—8 of Fig. 6.

In the drawings the base of the machine is shown at 10. It is provided with a bottom flange 11 by means of which the machine is adapted to be bolted or otherwise fastened to a vehicle. Its arrangement upon the vehicle is such that it moves in the direction of the arrow A, Figs. 2 and 6, when the vehicle is traveling forward. Directly in front of the dusting machine an engine (not shown) is mounted. The engine crankshaft is provided on its rear end with a female clutch element 12, Fig. 2, adapted to be engaged by a cone clutch element 13 for the transmission of power to the dusting machine. The cone 13 is mounted upon a collar 14 which is keyed to slide upon a shaft 15. Surrounding the shaft 15 between the collar 14 and a collar 16 pinned to the shaft, is a coil spring 17 which tends to hold the clutch elements in engagement. A rock shaft 18 is pivotally mounted in the base 10 below and transversely to the shaft 15, and is provided with a projection 19 that is adapted to engage with the sliding collar 14. The shaft 18 is provided with a crank handle 20 by means of which the projection 19 may be caused to exert pressure in opposition to the spring 17, whereby the clutch is released. A latch 21 is pivoted at 22 upon the base 11 and is adapted to engage behind a stop 23. The free end of the latch 21 has a hole therein loosely surrounding the crank handle 20, and the outer end of the latch is connected by a wire 24 with a collar 25 slidable on the handle 20. When the cone element 13 is to be moved into engagement with the clutch element 12, the collar 25 is raised sufficiently to lift the outer end of the latch 21 above the stop 23, and the spring 17 is then permitted to act. Hence, the operator may operate the clutch control readily with one hand.

The shaft 15 is provided with a spiral gear 26 that meshes with a second spiral gear 27 secured to a vertical shaft 28. The latter is mounted in bearings 29 and 30 carried by a gear casing 31 which has a top flange 32 bolted to the top of the base 10, as indicated in Fig. 1. The shaft 28 extends upwardly through the top of the base and carries all of the rotating parts of the dusting machine.

On top of the base 10, concentric with the shaft 28, I mount a fan housing 33. The fan is composed of a cast metal hub 34 and two sheet metal stampings 35 and 36. The stamping 35 has a central portion secured to a flange 37 on the hub 34 by rivets or the like. The stamping 35 comprises fan blades 38 bent upwardly at intervals and provided with tabs 39 which extend through suitable slots in the ring stamping 36. The two stampings are secured together by bending over the tabs 39. The outer ends of the blades 38 have small projections 40 thereon, the projections on one blade being offset slightly from those on the next blade. These projections clear the housing 33 by a small margin only, and because of their staggered relation on the several blades they cover together the full height of the housing and serve to keep the latter free from dust while causing much less friction than would be occasioned were the blades themselves extended to practically engage the housing wall. The hub 34 is keyed to the shaft 28, as indicated at 41 in Fig. 7.

The housing 33 at spaced points is provided with tangentially arranged exit connections 42, 43 and 44 for air and dust mixture, the connections 42 and 44 extending transversely in opposite directions and the connection 43 extending rearwardly. These connections are adapted to receive delivery pipes, not shown, which are directed downwardly toward the ground in spaced relation across the path of the vehicle.

Upon the housing 33 I support concentrically a feeder bowl 45 and a channel ring 46, the bowl 45 extending downwardly into the center of the fan housing through a relatively large opening in its top. The bottom of the bowl 45 has a hole 47 therethrough, of a diameter considerably larger than the diameter of the shaft 28. Rotatably mounted upon the shaft 28, just above the bottom of the bowl 45, is a washer 48 having a triangular outer edge. The washer 48 is prevented from rotating and from being dislodged upwardly by a triangular retaining plate 49 which is attached at its corners to the bowl 45. Hence the washer 48 is effective to prevent leakage of dust downwardly through the opening 47, and is free to move laterally, to a small extent, in response to the vibration or out of center movements of the shaft 28. Within the cylindrical lower portion of the bowl 45 the shaft has keyed thereto the hub 50 of a whipper 51, comprising a horizontal plate and two down-turned lips 52 and 53, both of which taper towards the bottom. The forward edge of the lip 52 is beveled on its outer side, while the forward edge of lip 53 is beveled on its inner side. The beveled forward edge of the lip 52, upon rotation of the whipper, serves to force the powder outwardly, while the beveled forward edge of the lip 53 acts as a knife to cut back the powder and maintain a free path for the rotation of the whipper. Lint, which is frequently present in the powder to be dispensed, is dislodged from the lips, not only by the action of gravity, but also because of the downwardly tapered edge surfaces of the whipper.

The cylindrical wall of the bowl 45 is provided at a plurality of points with slots 54 through which the powder is to be delivered. I have determined by experiment that two slots, positioned as indicated in Fig. 6, are adapted to satisfactorily distribute powder to the three outlet connections 42, 43 and 44 positioned as indicated in that figure. The number and position of the slots 54 is of considerable importance, and must be determined by experiment when the number or position of the outlet connections of the housing is changed. While a greater number of slots may be employed in connection with the design herein illustrated, it is not possible to effect an even distribution of powder with a single slot, when the outlet connections are arranged as shown.

In order to control the speed of delivery of dust, I mount a valve ring 55 to turn upon the bowl 45 through a limited angle. This mounting may be effected by a pin and slot connection, as illustrated in Fig. 7. The ring 55 has slots 56 therein adapted to uncover more or less of the slots 54, depending upon the position of adjustment of the ring. Attached to the ring 55 is a radial arm 57. At its outer end the blank for this arm is provided with a laterally extending portion 58 that is bent up and over to form a loop, as shown in Fig. 8. Within this loop there is mounted a radially extending slide 59 provided with an upturned rear end 60 to engage behind the ring 46 and an upwardly turned front end 61 extended to form a pointer. The end 61 is provided with a threaded opening in which is mounted a clamping screw 62, adapted to bear at its inner end against the ring 46. When the screw 62 is loosened, the arm 57 may be swung to effect the adjustment of valve ring 55, and when the desired adjustment is obtained the screw 62 is threaded inwardly to hold the parts in that position.

Supported upon the ring 46 is an outer cylindrical shell 63. This shell may have painted thereon indicia to indicate the degree of opening of the slots 54 for the various adjustments of the pointer 61. Near its upper end the shell 63 carries a pivot rod 64. The hopper in which the powder is stored comprises an inner shell 65 pivotally mounted upon the rod 64 and a bowl 66 that is tapered sufficiently to enable the hopper to extend into the tapered upper portion of the feeder bowl 45, the lower end of the hopper being open as shown in Fig. 1. 67 is an inverted cup-shaped support for a ball bearing 68 that surrounds the eccentric upper end 69 of the shaft 28. The support 67 is mounted upon sheet metal arms 70 which are riveted at their outer ends to the bowl 66 of the hopper. The arms 70 are arranged at right angles to the pivot rod 64, so that they are adapted to deliver to the hopper vibrations caused by the eccentric movement transverse to the pivot rod 64. In this manner the hopper is swung back and forth rapidly upon its pivot. The eccentric movement, of course, tends to move the center of the lower end of the hopper in a small circle, but this movement, except along the direction of the arms 70, is largely absorbed by the arms, owing to their resilient sheet metal construction.

On account of the deep cup-shape of the support 67, the air which is entrapped within the support, when the hopper is filled, prevents the powder from rising within the support, and thus keeps it away from the bearing 68. Practically the entire weight of the stored powder is carried by the hopper. When the hopper is filled a small arch of powder forms at the lower end above the discharge opening. Hence there is very little weight of powder upon the whipper 51, and the rotation of the latter requires very little power. The constant shaking of the hopper, however, keeps the supply of powder in the feeder bowl 45 constant, so that the rate of discharge from the bowl 45 is not affected by the amount of powder in the hopper.

The operation of the machine will be more or less obvious from the above description of its construction. When the clutch element 13 is permitted to engage the clutch element 12, the shaft 26 rotates and drives the vertical shaft 28, the gearing being preferably such that the speed of rotation of shaft 28 is somewhat above that of shaft 26. The hopper 65, 66 is thereby caused to swing rapidly back and forth upon its pivot rod 64, shaking powder downwardly as rapidly as it is delivered from the machine. The whipper 51 beats the powder in the feeder bowl 45 so that the suction of the fan readily draws it through the slots 54 and 56 into the fan housing. Air enters the housing through the central opening in the top thereof around the sides of the feeder bowl 45, and is mixed with the dust as the fan rotates. The mixture is forced outward rapidly by centrifugal action through the connections 42, 43 and 44, and thence through suitable pipe connections to the desired point of delivery.

While, in the foregoing description and accompanying drawings, I have described and shown with more or less particularity a single embodiment of the invention, I desire it to be understood that such detailed disclosure is primarily for the purpose of fully illustrating the invention, and is not to be construed as amounting to a limitation upon the scope thereof.

Having thus described my invention, I claim:

1. In a dusting machine, a dust hopper, means for pivotally mounting said hopper above the middle thereof for movement about a transverse axis, and means connected with the hopper near the lower end thereof for oscillating it upon said pivotal mounting.

2. In a dusting machine, a dust hopper, means for pivotally mounting said hopper above the middle thereof, a power shaft extending upwardly through the feed hole in the bottom of the hopper, a cam at the top of said shaft, and a cooperating element carried by said hopper against which said cam bears, whereby oscillations are imparted to the hopper.

3. In a dusting machine, a dust hopper, means for pivotally mounting said hopper above the middle thereof, a power shaft extending upwardly through the feed hole in the bottom of the hopper, an eccentric on the top of said shaft, a bearing for said eccentric, and means for supporting said bearing upon said hopper, said means being adaped to impart vibrations to the hopper in a direction transverse to said pivotal mounting.

4. In a dusting machine, a dust hopper, means for pivotally mounting said hopper above the middle thereof, a power shaft extending upwardly through the feed hole in the bottom of the hopper, an eccentric on the top of said shaft, a bearing for said eccentric, and means for supporting said bearing from said hopper comprising arms of sheet metal arranged in a vertical plane at right angles to said pivotal mounting.

5. In a dusting machine, a dust hopper, means for pivotally mounting said hopper above the middle thereof, a power shaft extending upwardly through the feed hole in the bottom of the hopper, an eccentric on the top of said shaft, a bearing for said eccentric, an inverted cup-shaped bearing holder supporting said bearing and extending downwardly around said shaft but spaced therefrom, whereby an air pocket is provided, and means carried by said hopper for supporting said bearing holder.

6. In a dusting machine, a feeder bowl having a vertical cylindrical side wall provided with an exit opening, means for supplying dust to said feeder bowl, a shaft extending upwardly into said bowl, and a whipper mounted on said shaft within the said bowl, said whipper comprising a horizontal portion, and downturned lips spaced slightly from the inner surface of the said wall.

7. In a dusting machine, a feeder bowl having a vertical cylindrical side wall provided with an exit opening, a shaft extending upwardly into said bowl, a whipper mounted on said shaft within the said bowl, said whipper comprising a horizontal portion, and downturned lips spaced slightly from the inner surface of the said wall, the forward edge of one whipper lip being beveled on its outer side to throw dust outwardly, and the forward edge of the other whipper lip being beveled on its inner side in order to cut back the dust.

8. In a dusting machine, a feeder bowl having a vertical cylindrical side wall provided with an exit opening, means for supplying dust to said feeder bowl, a shaft extending upwardly into said bowl, a whipper mounted on said shaft within said bowl, said whipper comprising a horizontal portion and downturned lips spaced slightly from the inner surface of the said wall, said lips being tapered downwardly whereby the discharge of lint is facilitated.

9. In a dusting machine a feeder bowl having a vertical cylindrical side wall provided with an exit opening, a shaft extending upwardly into said bowl, a whipper mounted on said shaft within the said bowl, said whipper comprising a horizontal portion, and downturned lips spaced slightly from the inner surface of the said wall, the forward edge of one whipper lip being beveled on its outside and inclined downwardly and rearwardly, and the forward edge of the other lip being beveled on its inner side and inclined downwardly and rearwardly.

10. In a dusting machine, a feeder bowl, the bottom of said bowl having an opening therethrough, a shaft of smaller diameter than said opening extending upwardly therethrough, a washer rotatably mounted upon said shaft within said bowl, and a plate anchored in said bowl overlying said washer and loosely engaging the same to permit slight lateral movement thereof in response to vibrations of the shaft.

11. In a dusting machine, a feeder bowl, the bottom of said bowl having an opening therethrough, a shaft of smaller diameter than said opening extending upwardly therethrough, a substantially triangular washer rotatably mounted upon said shaft within said bowl, and a substantially triangular plate loosely surrounding said shaft above said washer, said plate being attached at its corners to said bowl, whereby slight lateral movements of the washer in response to vibrations of the shaft are permitted.

12. In a dusting machine, a hopper pivotally supported, a vertical shaft extending upwardly into the exit opening of said hopper, operative connections between said shaft and hopper operative upon rotation of the shaft for swinging the hopper back and forth on its pivotal mounting, a feeder bowl located beneath the hopper and having an opening therein through which said shaft extends, and a dust whipper secured to the shaft within said bowl.

RALPH R. ROOT.